TAPE FEED MEANS

Original Filed March 30, 1961

7 Sheets-Sheet 1

INVENTOR.
Hilding A. Anderson

BY

Strauch Nolan & Neale
ATTORNEYS

INVENTOR.
Hilding A. Anderson
BY
Strauch, Nolan & Neale
ATTORNEYS

INVENTOR
Hilding A. Anderson

BY Strauch, Nolan + Neale
ATTORNEYS

March 8, 1966 H. A. ANDERSON 3,239,119

TAPE FEED MEANS

Original Filed March 30, 1961 7 Sheets-Sheet 4

INVENTOR
Hilding A. Anderson

BY Strauch, Nolan + Neale
ATTORNEYS

March 8, 1966 H. A. ANDERSON 3,239,119
TAPE FEED MEANS
Original Filed March 30, 1961 7 Sheets-Sheet 5
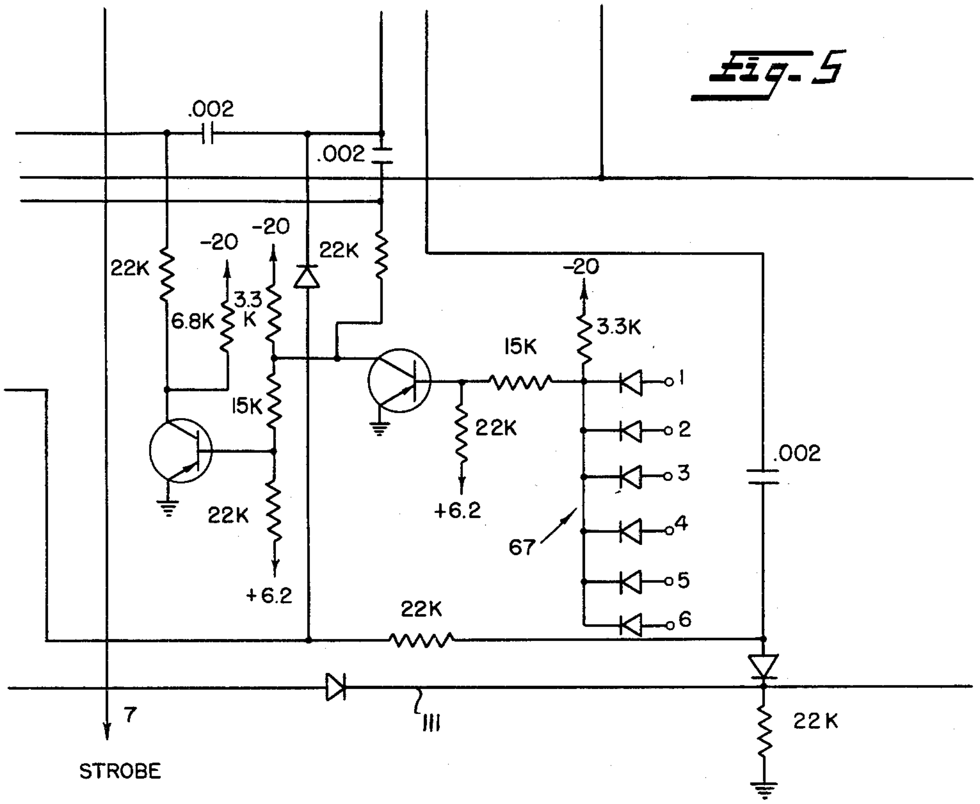
FIG. 5
FIG. 5A
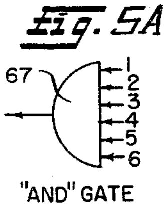
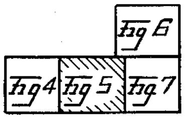
INVENTOR
Hilding A. Anderson
BY Strauch, Nolan + Neale
ATTORNEYS

TAPE FEED MEANS

Original Filed March 30, 1961

INVENTOR
Hilding A. Anderson
BY
ATTORNEYS

TAPE FEED MEANS
Original Filed March 30, 1961 7 Sheets-Sheet 7
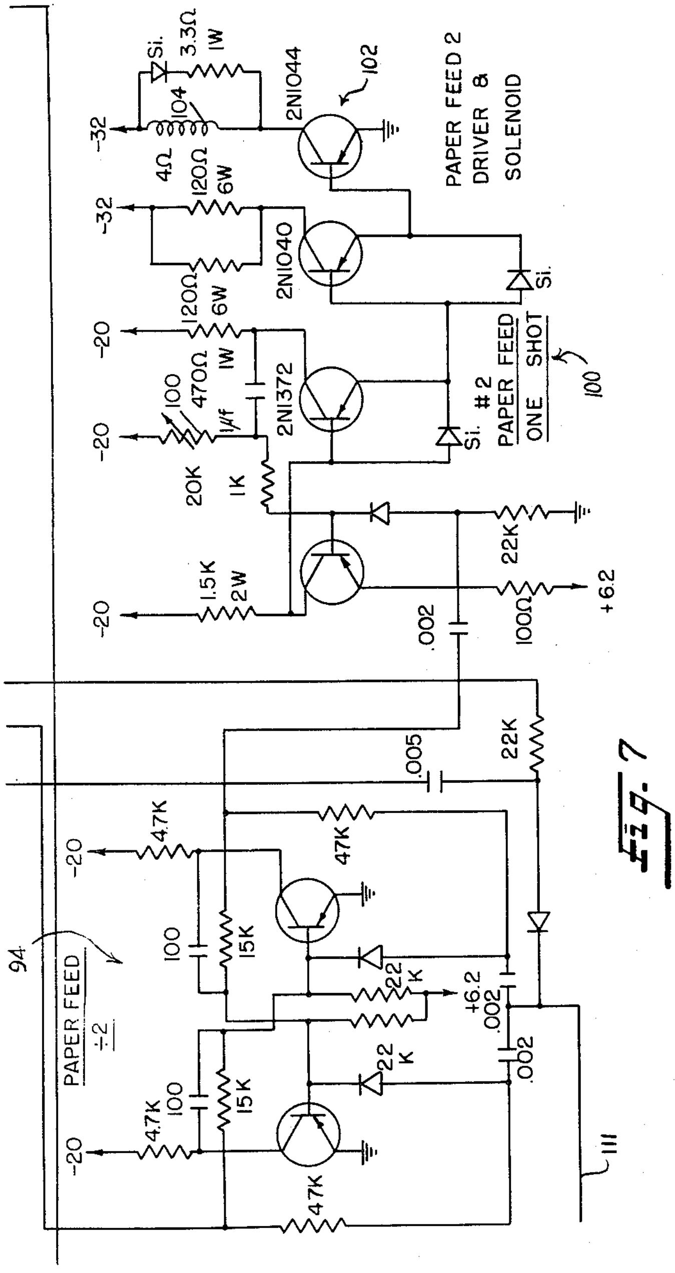
FIG. 7
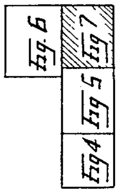
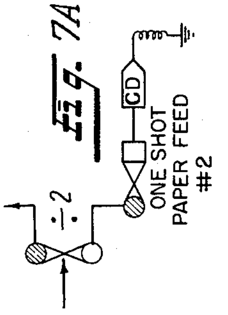
INVENTOR
Hilding A. Anderson
BY Strauch, Nolan & Neale
ATTORNEYS United States Patent Office 3,239,119
Patented Mar. 8, 1966

3,239,119

TAPE FEED MEANS

Hilding A. Anderson, Lake Zurich, Ill., assignor to SCM Corporation, New York, N.Y., a corporation of New York Original application Mar. 30, 1961, Ser. No. 103,183, now Patent No. 3,131,627, dated May 5, 1964. Divided and this application Apr. 23, 1964, Ser. No. 362,046
3 Claims. (Cl. 226—112)

This invention relates to a printer with a high speed tape feed device and more particularly to record tape feed apparatus for a high speed printer which prints a message, coded or otherwise, on tape, said message being received as electrical code signals which originate in a telegraphic or data processing system or other similar telegraphic media. This application is a division of co-pending U.S. application Serial No. 103,183, filed March 30, 1961, for High Speed Serial Printer, now U.S. Patent No. 3,131,627.

The invention in the aforenoted parent application uses, as a basic principle of operation, electronic selection and actuation of a desired one of two print hammers which are aligned in the direction of movement of the tape to print a serial message on a tape from two rows of characters positioned around the periphery of a continuously rotating typewheel. In recent years, as the need for higher speed printers has become urgent, printing "on the fly," i.e., printing without stopping the rotation of the typewheel has come into prominence, particularly in connection with printing computor output information delivered at high output rates. The high speed printer for which the present invention in tape fed was developed utilizes an electromagnetic impulse transducer form of typewheel position detector wherein a pulse is generated for each typewheel position starting from an indexing point (or points) and the pulse counts are compared with an incoming code signal in an electronic counter to determine the typewheel position. Print hammer actuation is then controlled relative to instantaneous shaft position to record any desired character, and spacing of the tape is coordinated with the high speed printing. The mode of the printer operation of the present invention could also be applicable to relatively low speed printers where shaft position impulses can be obtained by brushes and commutators, although the higher speed electromagnetic impulse transducer is the preferred and the least expensive construction.

Very briefly, the tape printer of the parent application uses two rows of type characters, each type row having its associated print hammer, and a dual tape stepping mechanism, which is associated, through control apparatus, for specific different modes of operation with each specific print hammer. One factor in the printer which increases speed is that whichever row of characters includes the character selected for printing, printing will occur at the next print position on the tape. This is accomplished by utilizing two basic modes of machine operation, termed "PRINT FIRST—THEN SPACE" (for characters in typewheel row #1) and "SPACE FIRST—THEN PRINT" (for characters in typewheel row #2). The appropriate mode of operation is automatically determined by the machine upon receipt of the appropriate character signal (the signal being coded according to desired typewheel row). Two additional modes of operation, essentially functional, are also provided: a "SPACE—NO PRINT" mode and a "MANUAL TAPE FEED-OUT" mode.

In a high speed tape printer, an important factor affecting ultimate speed of operation is that of tape feed. This invention provides two separate tape feed mechanism operators which are operated alternately to effectively double the available mechanical speed of tape feed. It is noted that the dual nature of the tape feed mechanism is not a direct resultant of the use of dual print hammers. Feed mechanism operation always alternates between the dual operators whereas print hammer operation may or may not alternate depending upon the reception sequence of characters. Primarily, dual feed enables sufficient feed speed to keep abreast or ahead of print speed.

Accordingly, a principal object of this invention resides in the provision of a novel electromechanical tape printer with dual tape feed mechanism capable of operating at very high speeds (i.e. sufficient available tape stepping feed operations per unit time to accommodate 300–400 words per minute).

A further object resides in the provision, in a tape printer, of novel multiple tape advancing mechanisms with mechanical components operating alternately (in response to successive signals received by the printer) for obtaining a faster mode of operation.

Still another object resides in the provision of a novel typewheel tape printer with electronic circuitry for receiving coded signal information and controlling mechanical print functions and mechanical tape space function electronically with at least two distinct modes of mechanically related operation of the printing and spacing mechanisms, and electronic means to inhibit (or bypass) the electronic print control but not the electronic tape feed control whenever the received signals are space signals or whenever manual tape feed is initiated.

Further objects and advantages of the invention will be apparent from the following description and the appended claims taken in conjunction with the accompanying drawings showing a preferred embodiment thereof, in which:

Figure 3:
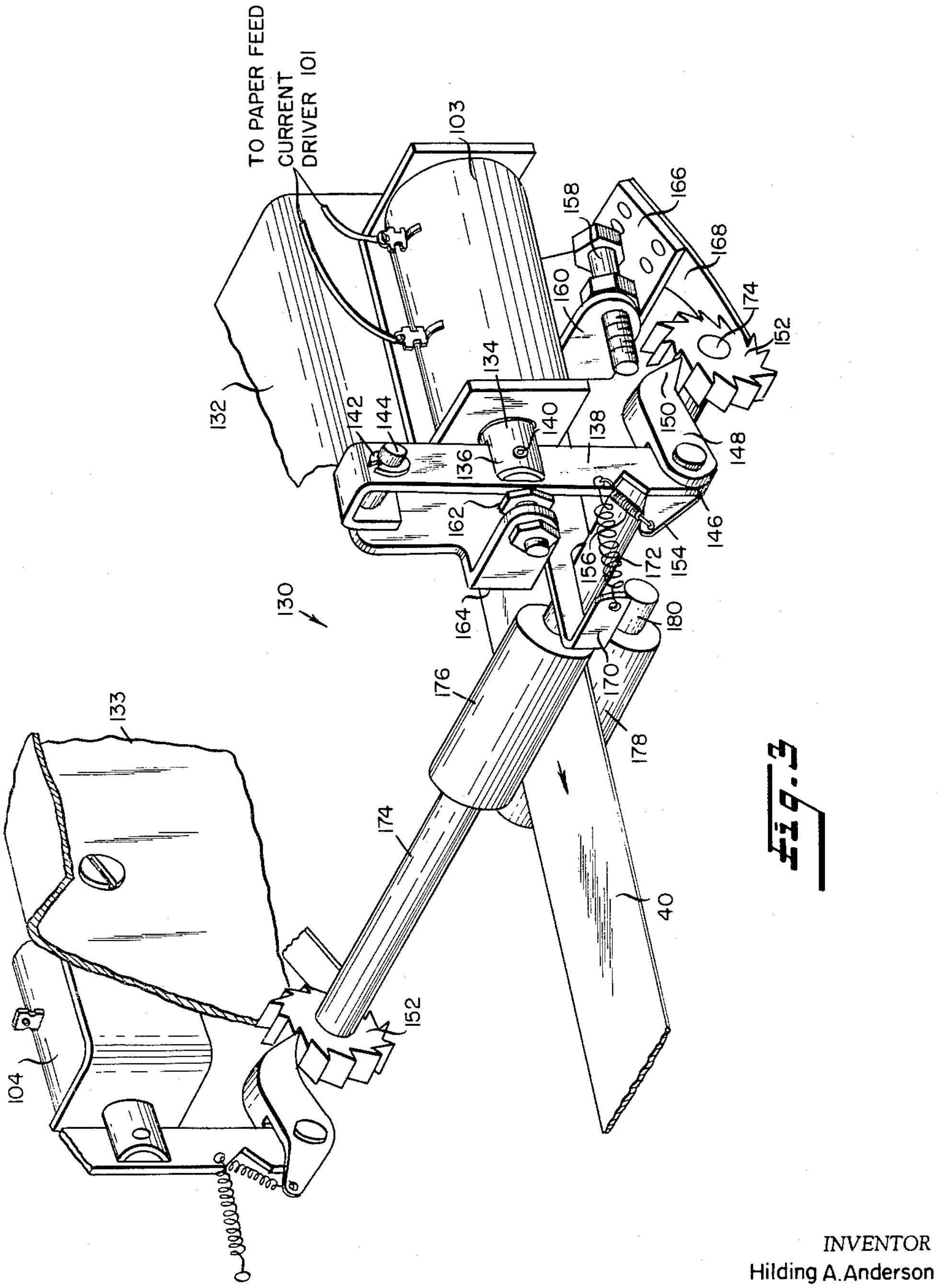
Figure 4:
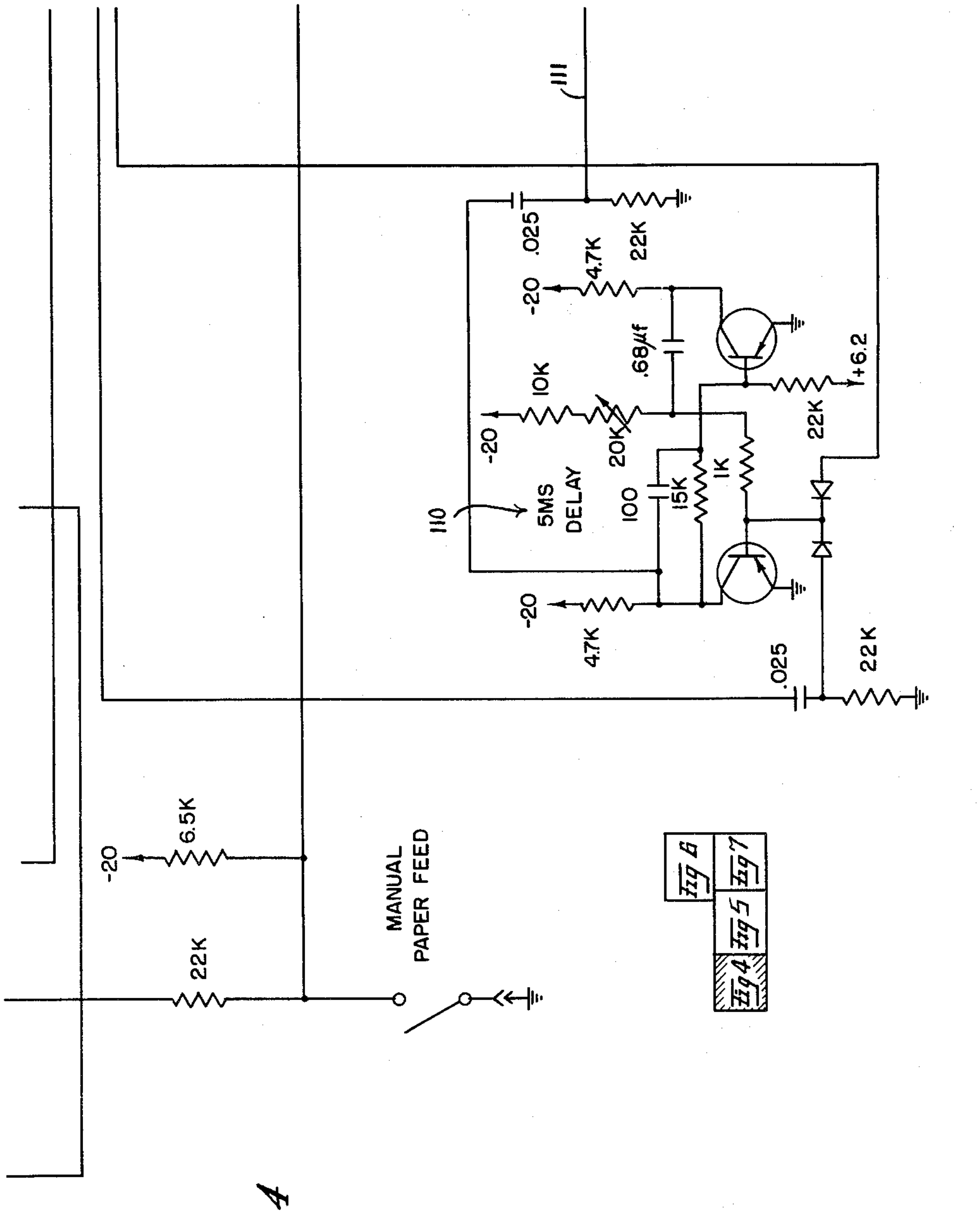
Figures 6, 6A, 6B, 6C:
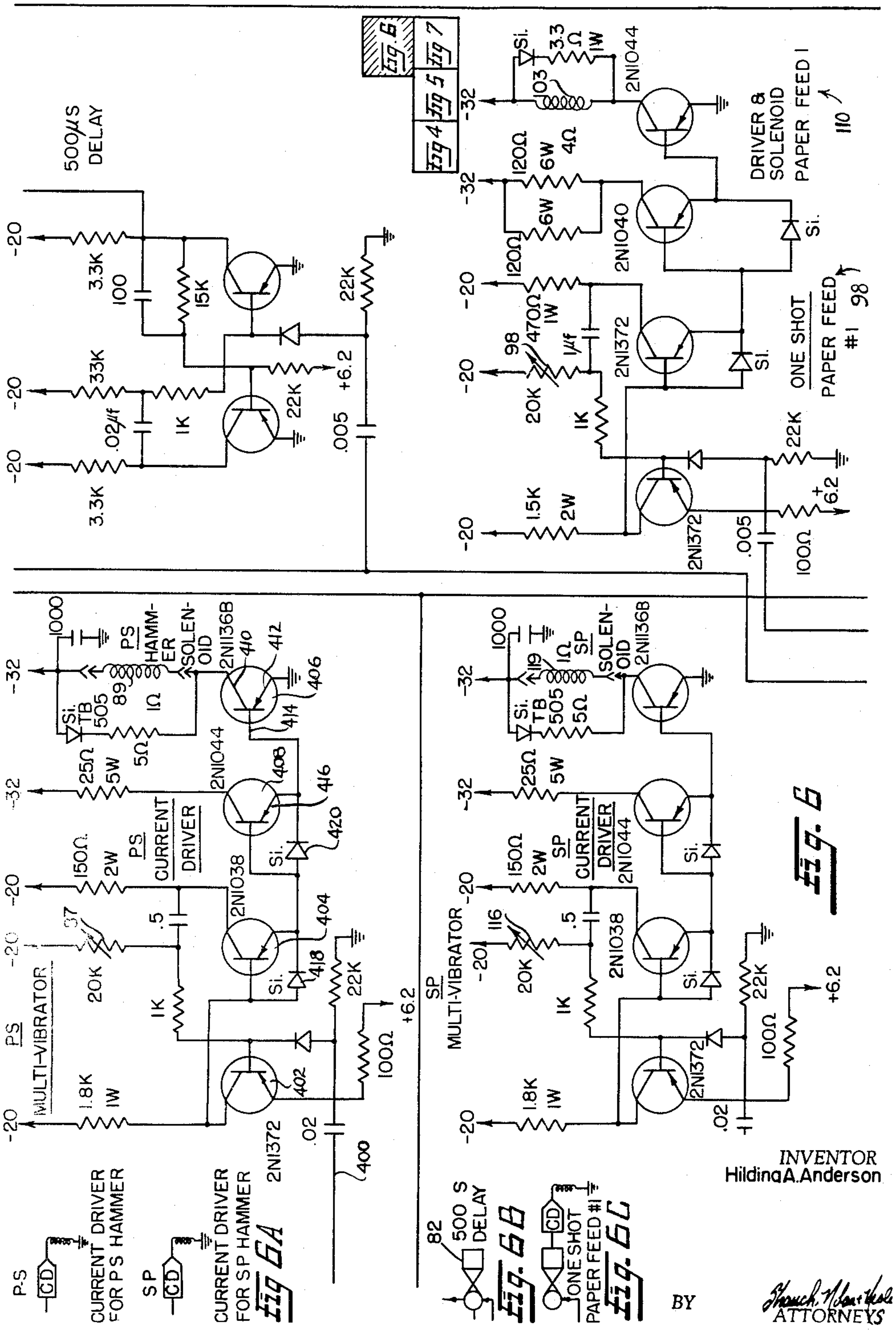

FIGURE 3 is an enlarged detail perspective illustrating the dual tape feed mechanism with support structure omitted for clarity; and FIGURES 4–7, taken as a unit, constitute a detailed circuit diagram of an exemplary transistorized circuit for control of the dual tape feed device in accord with the present invention, a legend key to the placement of each figure in the overall diagram being included with each figure. The detailed components of this circuit diagram correspond to the portion of the symbolized schematic diagram of the electronic components in FIGURE 1 pertaining to control of the tape feed, and representative symbolized components are included with most of the individual FIGURES 4–7 as subscript FIGURES 5A, 6A, B and C and 7A to enable a correlation of that portion of the detailed circuit with the overall symbolized circuit of FIGURE 1. For example, FIGURE 5A is the symbol for the SPACE—NO PRINT "and" gate detailed in FIGURE 5 and FIGURE 7A is the symbol for the detailed paper feed divide by 2 and the #2 paper feed one-shot and current driver circuit shown in FIGURE 7.

The following description is of a specific printer which includes transistorized circuits and controls and a dual record tape feed apparatus, in accordance with the present invention, correlated with the control circuitry. It is to be understood that the invention is not restricted to the disclosed dual hammer serial printer nor to the exemplary transistorized circuit components illustrated in FIGURES 4–7. Other types of circuit components and devices may be employed in the switching matrix, for example, vacuum tube switching circuits and magnetic core switches may be used. The illustrated transistorized circuit, however, does represent an operative and preferred construction of the printer.

The complete circuit combination and some subcombination circuits are novel and are disclosed, described and claimed in the aforenoted parent application and/or other divisional applications. Inasmuch as the various components of the detailed circuit of FIGURES 4–7, such as the "and" gates, delays, one-shots, current drivers, counters, registers, etc., are known, they will not be described in detail except for the following aspects. These or functionally equivalent circuits of course, could utilize electron tubes, but to conserve space, power, avoid heat and obtain long life of operating components, transistorized circuits are preferable. All of the depicted transistors in FIGURES 4–7 are 2N1372 unless otherwise indicated on the figures. All diodes are germanium D1034 unless otherwise marked. Silicon diodes are marked S1 and are SR162 unless otherwise indicated. All resistor values are noted in ohms and are 1/4 watt unless marked otherwise. All capacity values are in $\mu\mu$f. unless marked otherwise.

*General description*

By preliminarily stressing several basic aspects of the printer operation, and keeping these aspects in mind, understanding of the detailed description of the dual tape feed, its control apparatus, structure and operation which follows will be quite clear. Various aspects of the printer which are not necessary to an understanding of the invention of this application will not be fully described, however, a complete description may be found in parent application Serial No. 103,183, now U.S. Patent No. 3,131,627.

Figure 2:
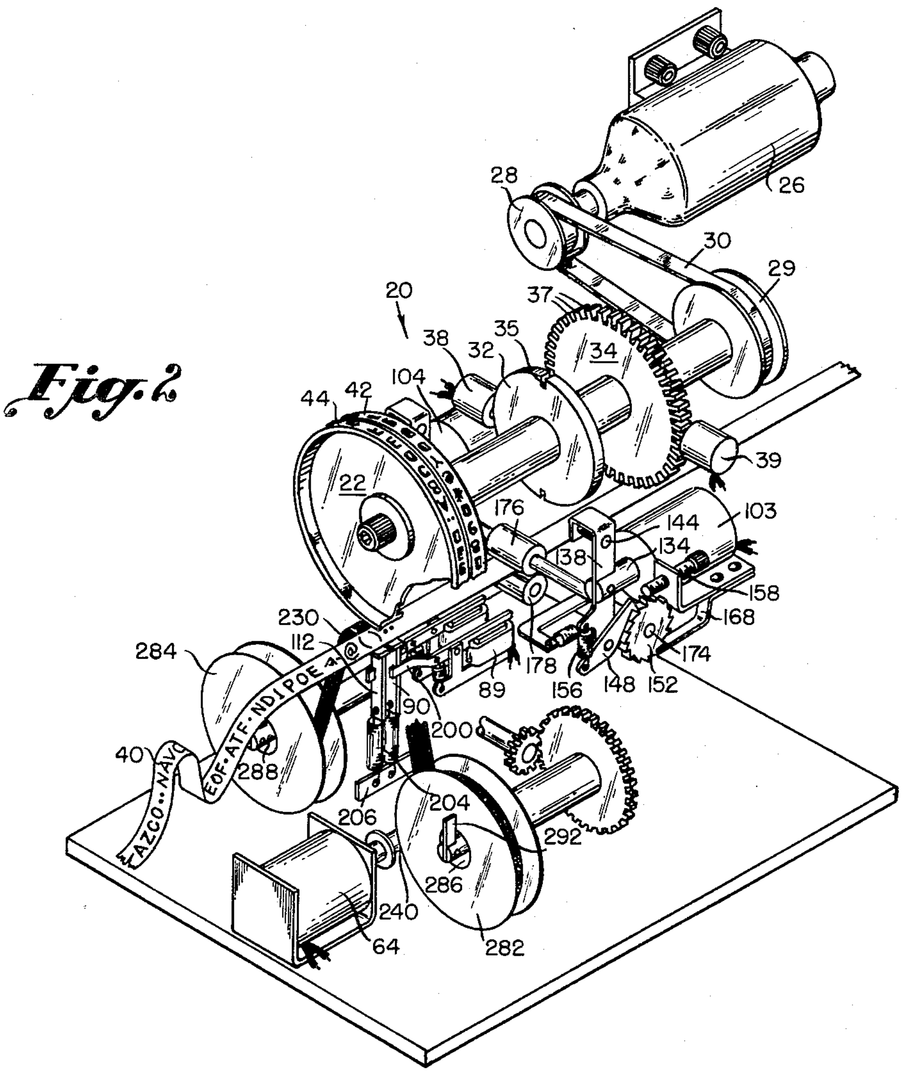
FIGURE 2 is a fragmentary perspective view of a printer, with support structure and control circuitry deleted, illustrating the primary mechanical components, the typewheel shaft position detector clocks with transducer members and the solenoids which operate the mechanical print hammer, tape feed and ribbon feed components.

Referring to FIGURE 2, the general arrangement of the mechanical components can be seen. The drive motor 26 is preferably mounted on the base structure but for convenience of illustration is shown moved to an upper location. The printer 20 has a dual row typewheel 22 which, during printer operation, is constantly rotating, being secured on a shaft 24 which is suitably journalled in the frame of the machine (not shown) and is driven by a synchronous motor 26 through pulleys 28 and 29 and a pulley belt 30. Also secured to rotate with shaft 12 is a two (2) notched clock wheel 32 and a sixty-four (64) notched clock wheel 34. The two notches 35 and 36 on clock wheel 32 are indexing points at the beginning-of-count position on the typewheel 22 while the sixty-four (64) notches 37 on clock wheel 34 are aligned with respect to the sixty-four character positions around the typewheel 22.

Clock wheels 32 and 34 are metallic discs made of high permeability magnetic material (such as wrought iron or mild steel), the notches in each, as the edges of the discs pass close to the magnetic pick-up members, causing a change in flux density in the magnetic field around the index coil 38 and the impulse counting coil 39 of the pick-up members. This change in flux density induces a surge of current and a changing E.M.F. in the pick-up circuits. The voltage signal is amplified and shaped by respective amplifiers 41 and 43 (FIGURE 1) which feed the indexing and counting signals to the machine control circuits, to be hereinafter described.

The machine is a serial tape printer, it prints one character or symbol and spaces or causes a space function of a message one unit at a time in a single line on a tape, the character to be printed being chosen from one or the other of the inner row 42 or the outer row 44 of the dual row typewheel 22. In the preferred embodiment, the characters in one row are different from the characters in the other row. Thirty-two different print characters or symbols can be included in each row and are repeated at 180° intervals in the same row, thus it is possible for the typewheel to contain sixty-four different characters, half in one row and half in the other row and each character will appear twice in its row at diametrically opposite positions (180°).

Still referring to FIGURE 2, a paper tape 40 feeds from right to left from a supply roll (not shown) by mechanism to be later described in detail. To aid in understanding, the inner typewheel row 42 is on the incoming tape side and the outer typewheel row 44 is on the tape feed-out side.

In order to serially print a message on the tape in this machine without overprinting and in order to operate the machine in a useful manner, the exemplary machine is capable of four basic modes of operation, now briefly described.

(1) If the character to be printed is located on the inner typewheel row, the machine will *print first* and then space the tape. This will be referred to as the "PRINT—SPACE" mode of operation. Note, at the end of this operation the tape is properly positioned to undergo a succeeding "PRINT—SPACE" operation if the next character to be printed is located on the inner row.

Although the tape has been stepped so that the character just printed is now directly under the outer typewheel row, a character selection from that row will not overprint because of the next described mode of operation.

(2) If the character to be printed is located on the outer typewheel row, the machine will *space the tape first* and then print the character. This will be referred to as the "SPACE—PRINT" mode of operation. Note, at the end of this operation the tape is positioned with the just printed character under the outer typewheel row, the same as the finish position of the "PRINT—SPACE" mode of operation. Thus the machine is ready to undergo a succeeding mode of operation which can be either "PRINT—SPACE" or "SPACE—PRINT" depending upon which row contains the character to be printed. In this manner, the resultant printed message will be properly serially recorded on the tape.

Determination of one or the other of the above two briefly described modes is by a sixth bit added to a five unit code signal combination, which in fact makes the code signals a six bit combination. Depending upon the presence or absence of a positive sixth bit pulse in the received signal, the control circuitry selects the mode of operation to record the desired character from the proper row.

Another point to be understood is that there are two print hammers, one of which is used only with the inner typewheel row of characters and the other of which is used only with the outer typewheel row of characters.

(3) A third mode of operation is designated the space but no printing mode, i.e., "SPACE—NO PRINT." Thus, if a "space" code signal is received, there is an automatic inhibiting of the operation of the counting and printing control circuits as a result of which, no printing actuation occurs. Yet at this time, a "space" signal is immediately directed to the tape feed mechanism, resulting in an immediate spacing of the tape but no printing.

(4) The fourth mode, entitled "MANUAL TAPE FEED," is just what its name implies. This operation is provided by a switch which inhibits counter and printing operations and feeds clock index pulse signals directly to the tape feed mechanism control circuit.

As previously mentioned, to hurdle the mechanical speed limitations of tape feed mechanism, duplicate tape feed devices are provided and their operation is always successively alternate. This is true regardless of which one of the four modes of operation is utilized, or of the sequence in which the modes occur.

The ink ribbon feed for the typewheel ink ribbon is stepped once for every second printer cycle of operation.

The circuitry for this operation is electronic and otherwise will not be described in this application.

The exemplary printer operates from six lines of data, received in parallel, plus a strobe line. As is conventional, each line furnishes one of two signals, sometimes referred to as "yes-no," "mark-space" or "pulse-no pulse". Information can be accepted at the rate of from 0 to 30 characters per second.

For convenience, the exemplary printer has been arranged to receive code signals in the form of five-unit binary code combinations. The source of the signals is not a part of the present invention; it may be a telegraphic transmitter, the output from a data computor or data storage device such as a magnetized tape record. A sixth channel is not used in the binary counter of the printer but instead is used for "odd-even" triggering purposes to select one of the "PRINT—SPACE" or "SPACE—PRINT" modes, an understanding of which is not necessary for the present invention, although it may be briefly referred to in describing the tape feed circuitry. A seventh channel can be included from the transmitter for use as a strobe or synchronization pulse channel.

If signals are derived from a tape storage device, the binary signals recorded on the magnetic tape induce pulsating voltages in a pick-up head, which voltage signals can be amplified and/or shaped as desired and applied through corresponding leads to a five stage binary counter circuit (see top of FIGURE 1) of the printer herein described. The code combination jams or pre-sets the counter to a desired count condition. Also, the sixth bit signal line leads to the single stage binary counter No. 6 (also at the top of FIGURE 1) which determines the selection of operation modes 1 and 2 (PRINT—SPACE or SPACE—PRINT), and a seventh input signal line leads to the strobe input (No. 7 at bottom left of FIGURE 1).

The position detection, pulse generated counts from the printer clock correspond to five unit binary code numbers. Many arrangements of the order of characters represented by serially generated binary code combinations are, of course, possible. For example, the 180° out-of-phase positions 1 and 33 on the typewheel and on the sixty-four notch clock disc 34 could both be for the two characters A and B, and the serial pulse count of one from the sixty-four notch wheel as expressed by the five unit binary code would be 00001. Thus binary 00001 represents both characters, but the characters are on different rows, e.g., "A" would be on the inner row of the typewheel and "B" on the outer row of the typewheel. Similarly, "C" and "D" could be represented by a two count pulse, which is the five unit binary code 00011, "E" and "F" by the three count pulse or code 00100 and so on for thirty-two sets of two or a total of sixty-four different characters (symbols, numbers, etc.).

Returning to the binary counter, as has been stated, it is the "destructive read-out" type, i.e., the counter is pre-set by the received simultaneous code signal and pulses sent into the counter by the sixty-four (64) notch clock wheel 34 will complete the counter operation from the pre-set count, through the thirty-two count whereupon the counter returns to its zero count condition, at the same time providing a control pulse signal to operate the printer functions.

In destructive read-out, the code combinations repersenting characters on the incoming signal lines are the complement of the serially produced binary signal count from the printer clock disc. Thus, using the five unit binary code (thirty-two numbers not including zero), the complementary number for the "A" and "B" print positions, noted previously as being 00001 in the printer, would be 31 or 11111.

To print A or B, therefore, the incoming code signal on lines 105 would consist of a pulse on each line or 11111 which will jam or pre-set the binary counter to 31. Thus when one (1) pulse is received from the sixty-four notch clock disc (after an index pulse) one or the other of the two characters A and B can be printed. With A located on the inner row 42 of the typewheel 22 and B on the outer row 44, the absence or presence of a signal pulse on the sixth incoming line will be used to determine whether the desired character to be printed is A or B.

*Control circuit and operation*

Inasmuch as the only mechanical printer component of specific interest relative to the present invention is the dual tape feed device and it is actuated by the control circuit, the control circuit will be first described, and then the specific details of the dual tape feed device will be described in detail in a later portion of this specification.

Figure 1:
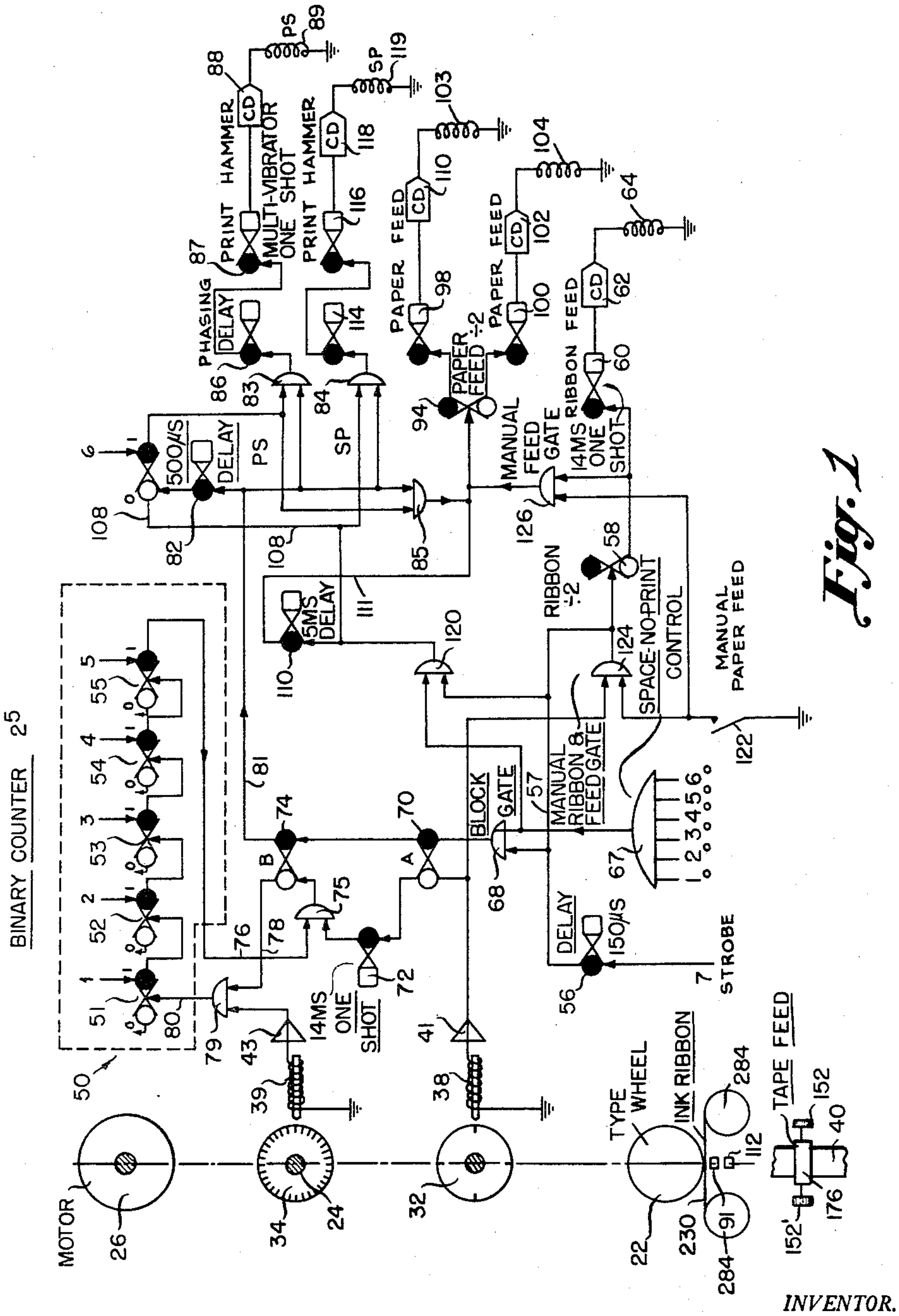
FIGURE 1 is a block diagram of a printer with record tape feed mechanism in accord with the present invention, the electronic control and mechanical components being illustrated by schematic symbols.

In describing the control circuitry, reference will be primarily to FIGURE 1 and the symbolized components such as the binary counter registers, "and" units, delay units, current drivers, etc. The specific manner in which each circuit component, pertinent to direct control of the tape feed mechanism, accomplishes its function will be understood by those skilled in the art and is clearly apparent from the detail circuits in FIGURES 4–7.

As has been aforenoted, the printer has four modes of operation, "PRINT—SPACE," "SPACE—PRINT," "SPACE—NO PRINT" and "MANUAL FEED-OUT." The circuits to accomplish these modes will be described in the order named.

*Print-space mode*

The print-space mode records a character on the inner row 42 of the typewheel 22 and then feeds the tape 40 one step. Because the adjacent two different characters on the typewheel inner and outer rows 42 and 44 are represented by a single incoming simultaneous five unit binary code to binary counter 50 and are also represented by a single serial binary count (complement of the simultaneous code) from the clock disk 34, one additional incoming data line 6 is used to determine whether there will be a "print first-space later" operation or a "space first-print later" operation. If no information is received from data line 6 by the sixth register 46, the character desired for selection will be on the inside row 42 of typewheel 22, and accordingly, the character must be printed first and the tape 40 must then be stepped. In the "print first-space later" condition, binary code information is received on lines #1 through #5 to the binary counter registers 51–55 and no signal will be present on line #6 to register 46. At the same instant a "strobe" signal will be received on line 7 which is connected to a 150 microsecond delay 56 to assure that the received data on lines 1–5 is completely entered in the registers 51 through 55 of counter 50.

From the 150 microsecond delay 56, the "strobe" signal pulse passes through a circuit line 57 to several branches, one of which is a ribbon feed divide-by-two register 58 which requires two consecutive pulses to operate a ribbon feed one-shot multivibrator 60 of 14 milliseconds duration which in turn feeds a current driving stage 62 to activate a ribbon feed solenoid 64 to move the inking ribbon 66.

The 150 $\mu$s. delayed "strobe" pulse on line 57 is also presented to a "space-no print" blocking gate 68 which, as will be later described, is blocked only when a simultaneous 00000 condition is present in binary counter 50. So long as a character signal is present on input lines 1–5, the blocking gate 68 passes the delayed strobe pulse to an A register 70, cocking the A register 70 to enable acceptance of indexing signal information from the amplifier 41 of the two notched index wheel 22 on the typewheel shaft 24. Cocking of register A pulses a 14 ms. delay one-shot 72 which is tripped to provide a 14 ms. blocking of a reset line 76 to a B register 74, by means of an end-of-count "and" gate 75.

The first index pulse from the pick-up coil 38 of the two notch wheel 32 passes through its amplifier stage 41 to the reset line of the A register 70 which trips and, in turn, trips the B register 74. Tripping of B register 74 through a circuit line 78 opens the "and" gate 79 to the binary counter input line 80, permitting the sixty-four (64) notch clock disc 34 to serially enter its pulses through its amplifier stage 43 and the opened "and" gate 79 into the $2^5$ counter stages of binary counter 50. The serial pulses entered into the $2^5$ counter registers 51–55 complete the count, previously pre-set by the received simultaneous binary code data on lines 1–5, to zero. The final serial pulse from clock wheel 34, which clears the binary counter 50, gives rise to an output of the fifth stage 55 which feeds back through previously described reset line 76 to and through the end-of-count "and" gate 75 to turn off the B register 74 which, in turn, closes the count "and" gate 79.

If an end-of-count on the reset line 76 from binary counter 50 occurs before the 14 millisecond delay 72 (which controls the end-of-count gate 75) has completed its time cycle, the end-of-count gate 75 remains closed and the B register 74 will not be turned off. Accordingly, the sixty-four (64) notch wheel 34 and pick-up 39 will continue to dump pulses through the counter input gate 79 into the $2^5$ counter registers 51 through 55 (which at this stage of the cycle are not longer pre-set) for thirty-two more pulses (180° rotation of typewheel shaft taking 15.2 ms.) and the ensuing end-of-count pulse through line 76 to the now open end-of-count gate 75 will reset the B register 74, closing the count gate 79.

When the B register 74 becomes reset, a signal goes out on a circuit line 81 to a 500 microsecond delay one-shot 82 and prevents the #6 register 46 from being prematurely reset. This same signal from B register 74 on line 81 also goes to three additional units, (1) a paper feed "and" gate 85, (2) a print hammer "and" gate 83 which controls an actuating signal to the print-space (PS) print hammer actuation circuit, and (3) a second print hammer "and" gate 84 which controls an actuating signal to the space-print (SP) print hammer circuit.

In the present considered print first-space later (PS) condition, the PS print gate 83 has been initially conditioned by the fact that there was no data input on the input line 6 to register 46 and, therefore, when the pulse from B register 74 feeds to the PS print gate 83, the signal passes to a phasing one-shot delay 86 which in turn pulses a one-shot multi-vibrator 87 and a current driven stage 88, which in turn energizes a PS hammer operating solenoid 89. When PS solenoid 89 is energized, the corresponding print hammer 90 is caused to record the selected character from the inner typewheel row 42 on the tape 40.

Because in this PS mode of operation no data was received on the receive signal line 6 to register 46, the aforedescribed paper feed "and" gate 85 was conditioned at the same time as was the PS "and" gate 83 so that when the pulse comes from B register 74, the signal passes through the paper feed "and" gate 85 and a pulse is sent to a paper feed divide-by-two register 94 which in turn pulses one of two paper feed one-shots 98 or 100 to trigger a corresponding one of two current drivers 101 or 102, which energizes an associated one of two feed operating solenoids 103 or 104. Successive pulses to the paper feed divide-by-two register 94 operate alternate ones of the two paper feed solenoids 103 or 104.

*Space-print operation*

Considering now the second mode of operation, if the character to be printed is located on the outside row 44 of typewheel 22, a space first-print later (SP) operation is required. In this instance, data information will be received on the input line 6 to register 46 coincident with the received binary code data on lines 1–5. A signal data pulse on line 6 resets register 46 and sends current through circuit line 108, a branch of which feeds the current to drive a 5 millisecond delay 110. After the 5 millisecond delay, a pulse from the delay unit 110 through a circuit line 111 by-passes the paper feed "and" gate 85 and will directly energize the paper feed divide-by-two register 194 to alternately drive one of the paper feed one-shots 98 or 100, the associated one of the current drivers 101 or 102 and finally the associated one of the two feed solenoids 103 or 104. The paper tape 40 is thus stepped after only a 5 millisecond delay without waiting for an output pulse on line 81 from the B register 74.

In the meantime, the #6 register 46 also determines which of the two hammers, the inside PS hammer 94 or outside SP hammer 112, is to be used for printing. In this instance, SP mode of operation, the output from the "O" side of register 46, which is now in reset condition, will condition the SP print hammer gate 84 so that when an output pulse from B register 74 is received on line 81, the SP print hammer gate 82 is open and will feed a pulse to the SP phasing one-shot delay 114, thence on to the SP one-shot multi-vibrator 116 and finally to the current stage 118, energizing SP print hammer solenoid 119 to actuate the SP print hammer 112.

The output pulse from B register 74, as has been described in the PS mode, also pulses the 500 microsecond delay one-shot 82 which clears the #6 register 46 to its set condition and relieves the SP controls through line 108 on the paper feed gate 85 and the SP print hammer circuits.

*Space—no print operation*

Considering now the third mode of operation, the signal operated tape feed-out function (space—no print), no data is entered into the $2^5$ binary counter 50 nor through the #6 line to register 46 (i.e., the binary code signal 00000 and a sixth 0). However, the strobe pulse to strobe line 7 will be continuously sequentially received. "O" condition circuits between binary counter 50 and the "space—no print" "and" gate 67 provide for the "O" condition of all of registers 51–55 to open the "space—no print" control gate 67, which in turn conditions the previously described space—no print blocking gate 68 to closed condition. When gate 68 is closed, it prevents the delayed strobe pulses on strobe input delay line 57 from passing through to the A register 70 and this in turn inhibits the count triggering function of the index pulses from the two notch wheel 32. Nevertheless, the delayed stroke pulse in line 57 is channeled to both the ribbon feed mechanism divide-by-two register 58 and through an "and" gate 120, which is conditioned by the 00000 controlled pulse in circuit line 57 from the space—no print control gate 67, to the aforedescribed 5 millisecond delay 110. From delay 110 the pulse is fed through line 111 to the divide-by-two paper feed register 94 and alternately through delays 98 or 100 and current drivers 101 or 102 to the associated tape feed solenoid 103 or 104.

Thus, one or the other of tape feed solenoids 103 and 104 is energized to step the paper tape 40 one step each strobe pulse received on line 7 and this stepping occurs without actuation of the print selecting mechanism which is completely inhibited so no printing of characters and no counting of pulses occurs.

*Manual tape feed-out operation*

In the fourth mode of operation, manual tape feed-out, a manual switch button 122 (bottom center of FIGURE 1) is closed to ground. While the printer motor is running, closing of switch 122 will condition a manual ribbon and feed control "and" gate 124, permitting the amplified indexing pulses from the two notch wheel 32 to pass through the gate 124 to the aforedescribed ribbon feed divide-by-two register 58, and thence on to the ribbon feed circuit. The pulses in this circuit branch off through a manual feed "and" gate 126 and through the tape feed control line 111 to the divide-by-two paper feed register 94 and thence through the aforedescribed paper feed circuit to step drive the paper feed mechanism.

*Mechanical structure and operation*

Referring primarily to FIGURE 2, the relationship between all mechanical components can be seen. The motor 26, pulleys 28, 29, belt 30, typewheel and clock disc shaft 24, typewheel 22, the two (2) notch indexing clock disc 32, and the sixty-four (64) notch position pulse clock disc 34 have been described.

*Tape feed*.—An important aspect of the present invention is the dual tape feed mechanism, the two independent driving assemblies which operate alternately for successive space operating cycles of the machine. The tape feed mechanism 130 is shown in an enlarged detail view in FIGURE 3 and in combination with the other mechanical printer components in FIGURE 2.

As has been described in the foregoing sections on circuit operation, each time a paper tape feed signal is applied on line 111 to the paper feed divide-by-two register 94 (see FIGURE 1), a momentary energization of one or the other of the paper feed solenoids 103 or 104 will occur. These two solenoids 103 and 104, in FIGURE 3, are secured to a bracket structure 132, 133 attached to the machine frame (not shown) on each side of the typewheel shaft 24 (see FIGURE 2) and behind the typewheel 22. Except for differences enabling right and left-hand mounting, the two assemblies of tape feed solenoids and attached operating mechanisms are identical, hence only one assembly will be described in detail.

A tape feed solenoid 103 includes a reciprocable plunger 134 with a slotted end 136 embracing and pivotally secured to a mid-section of a pawl lever 138 by a spring pin 140. The upper end 142 of pawl driving lever 138 is pivotally mounted on a horizontal stud 144 secured to bracket 132, while the lower end 146 of the lever pivotally carries a pawl 148, the driving end 150 of which engages the teeth of a tape feed ratchet wheel 152. Extending from the rear end of pawl 148 is an ear 154 to which one end of a pawl biasing spring 156 is attached, the other end of spring 156 being anchored to lever 138 so the spring biases pawl 148 against the ratchet wheel 152.

The limit of the driving stroke movement of pawl 148 is set by an adjustable stop screw 158 threaded in a bracket ear 160. The limit of the return stroke movement of pawl 148 is provided by an adjustable stop screw 162 in the path of movement of the driving lever 138 and aligned with the solenoid plunger 134, the return stop screw 162 being threaded in a second ear 164 on bracket 132. A third ear 166 at the lower edge of bracket 132 mounts a leaf spring detent 168, the end of which is flexed up against the ratchet wheel 152 to serve as an anti-backlash stop for the ratchet wheel when the pawl 148 is making its return stroke. A fourth bracket ear 170 serves as an anchor for one end of a heavy pawl lever return spring 172, the other end of which is attached to the lower portion of the pawl driving lever 138.

Ratchet wheel 152 is non-rotatably secured to a lateral shaft 174 which (see FIGURE 2) passes just to the rear of the lower portion of the typewheel 22. The opposite end of shaft 174 carries a second ratchet wheel 152', identical to ratchet wheel 152, non-rotatably secured thereto with the circumferential teeth locations matched with those of wheel 152. The alternate tape feed solenoid 104 has pawl operating components similar to those just described which coact with the second ratchet wheel 152' to rotate the shaft in steps exactly equal to the step rotation enabled by solenoid 103 and pawl 148.

Paper tape 40 is driven by engagement between two rollers 176 and 178 made of rubber or the like material. Roller 176 is non-rotatably secured on shaft 174 at the approximate mid-point of the shaft and the idler roller 178 is mounted on an axis parallel to shaft 174 so the rollers are in a slightly compressed engagement. The main roller feed shaft 174 and the idler roller shaft 180 are suitably journalled (not shown) on the machine frame and located in a manner so that the paper tape 40 which feeds between rollers 176 and 178 from a supply roll (not shown) will pass under and tangent to the bottom center of the typewheel 22 (see FIGURE 2).

Considering the mechanical operation of the tape feed mechanism 130, a tape feed signal pulses solenoid 103 or 104 (not both at once) pulling the associated plunger 134 inward, and it, being attached to a pawl driving lever 138, causes lever 138 to pivot counterclockwise on pivot stud 144. Pawl 148 on the lower end of the lever 138 is held continuously in contact with the teeth of ratchet 152 and when lever 138 moves counterclockwise, will engage and push on a ratchet tooth, rotating ratchet 152 in a clockwise direction until end 150 of the pawl hits stop 158. The detent leaf spring 168 assures a positive stepping action Ratchet 152, being affixed to shaft 174, rotates shaft 174 clockwise. Roller 176, being attached to shaft 174, rolls compressed against the mating idler roller 178 and the tape 40 passing between the two rollers is thus fed in steps under the rim of the typewheel 22, above the aligned print hammers 90 and 112 and above the ink ribbon.

With this dual arrangement of tape stepping assemblies, driving actuations of either lever and pawl unit can be started while the previously actuated other lever and pawl unit is starting its return movement. Thus the maximum speed of operation of tape feed of the machine, as determined by the time cycle of operation of the pawl linkage, is effectively doubled.

*Printing mechanism*.—The print hammer mechanism 190 is shown in combination with the other mechanical components in FIGURE 2 and details are fully disclosed and described in the aforenoted parent application Serial No. 103,183.

*Ink ribbon mechanism*.—This mechanism includes ink ribbon feed and reversal and is fully disclosed and described in the aforenoted parent application Serial No. 103,183 although a portion of the mechanism is seen in FIGURE 2.

The foregoing portion of the specification constitutes a full description of the mechanical structure and control circuit of a new dual tape feed device as incorporated in an electronic high speed serial tape printer. The electronic control provides high speed operation by selecting a desired one of two distinct modes of timed, correlated operation between a print hammer and tape feed to result in clean, even, legible and serially printed messages on the tape at approximately 30 characters per second. The printer utilizes dual tape stepping assemblies, each of which is alternately operated as a result of sequential machine operational cycles corresponding to received strobe pulses. A novel manual tape circuit is described which steps the tape once every thirty millisecond, as distinguished from signal controlled tape stepping which occurs at a rate averaging once every 33⅓ milliseconds or 30 times each second.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tape printer including tape feeding means comprising: at least two similar feeding mechanisms; a common tape engaging means operable by each said feeding mechanism, each of said feeding mechanisms being independently capable of being operated to drive said tape engaging means and step the tape one character space for each cycle of printer operation; operating means for said tape feed mechanisms comprising an independent power operator for each feed mechanism; and control means providing cyclic tape feed actuation signals and including means which directs successive feed actuation signals alternately to actuate said two independent operators.

2. In a tape printer, a tape feed means comprising: a tape engaging roller; a rotary shaft carrying and driving said roller; a plurality of similar feeding mechanisms operatively connected to impart identical drive movements to said shaft; and means connected to said feed mechanisms for actuating record feed operation including a electronic switching means which alternately selects a different one of said feed mechanisms for successive feed operations.

3. In a tape printer, a record tape feed means comprising: a tape engaging roller; a rotary shaft carrying and driving said roller; a plurality of similar pawl and ratchet feeding mechanisms including solenoid operated stepping pawls in ratcheting engagement with identical stepping ratchet wheels non-rotatably secured in substantially identical radial dispostion on said shaft to impart identical drive movements to said shaft upon energizing of either solenoid; and means for actuating record feed operation including a switching device which alternately selects and energizes a different one of said feed mechanism solenoids for successive feed operations.

References Cited by the Examiner

UNITED STATES PATENTS

| | | | |
|---|---|---|---|
| 129,391 | 7/1872 | Brown | 178—42 |
| 2,040,856 | 5/1936 | Krum et al. | 178—42 |
| 2,530,961 | 11/1950 | Hansen | 226—157 X |
| 2,684,597 | 7/1954 | Binks | 74—158 |
| 2,978,158 | 4/1961 | Herr | 226—156 X |
| 3,036,474 | 5/1962 | Perez | 271—51 X |

FOREIGN PATENTS

| | | |
|---|---|---|
| 183,361 | 7/1922 | Great Britain. |

M. HENSON WOOD, Jr., *Primary Examiner.*

SAMUEL F. COLEMAN, ROBERT B. REEVES, *Examiners.*